United States Patent
Xie et al.

(10) Patent No.: US 12,228,217 B2
(45) Date of Patent: Feb. 18, 2025

(54) MAGNETIC PRESSURE RETAINING CONTROL DEVICE

(71) Applicant: SHENZHEN UNIVERSITY, Shenzhen (CN)

(72) Inventors: Heping Xie, Shenzhen (CN); Mingzhong Gao, Shenzhen (CN); Guikang Liu, Shenzhen (CN); Ling Chen, Shenzhen (CN); Bo Yu, Shenzhen (CN); Cong Li, Shenzhen (CN); Chenghang Fu, Shenzhen (CN); Jianjun Hu, Shenzhen (CN); Mingqing Yang, Shenzhen (CN); Nianhan Wu, Shenzhen (CN); Zhiqiang He, Shenzhen (CN)

(73) Assignee: SHENZHEN UNIVERSITY, Guangdong (CN)

( * ) Notice: Subject to any disclaimer, the term of this patent is extended or adjusted under 35 U.S.C. 154(b) by 0 days.

(21) Appl. No.: 18/250,699

(22) PCT Filed: Jul. 15, 2021

(86) PCT No.: PCT/CN2021/106495
§ 371 (c)(1),
(2) Date: Apr. 26, 2023

(87) PCT Pub. No.: WO2022/205677
PCT Pub. Date: Oct. 6, 2022

(65) Prior Publication Data
US 2023/0400111 A1  Dec. 14, 2023

(30) Foreign Application Priority Data
Mar. 31, 2021 (CN) .......................... 202110351854.4

(51) Int. Cl.
*F16K 15/03* (2006.01)
*F16K 15/18* (2006.01)
(Continued)

(52) U.S. Cl.
CPC ........ *F16K 27/0227* (2013.01); *F16K 15/034* (2021.08); *F16K 15/1821* (2021.08); *F16K 31/0655* (2013.01); *F16K 31/084* (2013.01)

(58) Field of Classification Search
CPC .. F16K 15/031; F16K 15/034; F16K 15/1821; F16K 15/1841; F16K 17/02;
(Continued)

(56) References Cited

U.S. PATENT DOCUMENTS 5,169,117 A * 12/1992 Huang .................. F16K 31/086
251/38
6,729,368 B2 * 5/2004 Nguyen .............. F16K 15/1821
137/448
(Continued)

FOREIGN PATENT DOCUMENTS

CN    102506206 A    6/2012
CN    103527795 A    1/2014
(Continued)

*Primary Examiner* — Hailey K. Do
(74) *Attorney, Agent, or Firm* — MUNCY, GEISSLER, OLDS & LOWE, P.C.

(57) ABSTRACT

Disclosed is a magnetic pressure retaining control device, which comprises: a valve seat, a magnetic valve cover, and a trigger magnetic member for repelling the magnetic valve cover; the magnetic valve cover and an open end of the valve seat are movably connected; when the magnetic valve cover is in an open state, the trigger magnetic member is opposite to an end surface of the magnetic valve cover away from an inside of the valve seat. A cylindrical magnet is also arranged in the valve seat. By the magnetic between the trigger magnet and the magnetic valve cover, and the magnetic between the magnetic valve cover and the valve seat, (Continued)

a reliable guarantee for the closure between the magnetic valve cover and the valve seat is provided. The valve seat and the valve cover are tightly closed under different conditions.

9 Claims, 4 Drawing Sheets

(51) Int. Cl.
  *F16K 27/02* (2006.01)
  *F16K 31/06* (2006.01)
  *F16K 31/08* (2006.01)
(58) Field of Classification Search
  CPC ........ F16K 17/025; F16K 17/12; F16K 24/00; F16K 24/02; F16K 24/04; F16K 27/0227; F16K 31/0655; F16K 31/084; F16K 31/086; F16K 31/088; E21B 2200/05
  See application file for complete search history.

(56) References Cited

U.S. PATENT DOCUMENTS

| | | | |
|---|---|---|---|
| 7,703,532 B2* | 4/2010 | O'Malley | E21B 34/105 |
| | | | 166/66.5 |
| 2005/0006612 A1 | 1/2005 | Ji et al. | |
| 2010/0294502 A1 | 11/2010 | Xu | |
| 2022/0049789 A1* | 2/2022 | Barot | F16K 31/086 |

FOREIGN PATENT DOCUMENTS

| | | |
|---|---|---|
| CN | 104947785 A | 9/2015 |
| CN | 111457151 A | 7/2020 |
| CN | 111911638 A | 11/2020 |
| CN | 111911639 A | 11/2020 |
| KR | 20050077815 A | 8/2005 |

* cited by examiner

MAGNETIC PRESSURE RETAINING CONTROL DEVICE

TECHNICAL FIELD

The present disclosure relates to the technical field of corer sealing device, in particular to a magnetic pressure retaining control device.

BACKGROUND

During deep rock core sampling, the flap valve of the existing pressure retaining control device is flipped and closed relying on the gravity when working vertically. However, under certain conditions of rock coring, the gravity-driving method is unreliable due to the effect of the drilling direction etc., and the pressure retaining effect could not be achieved as expected. When the pressure retaining control device is coring in horizontal or inclined direction, there is no force for the valve cover to be rotated and closed that against gravity or friction, which would also make the pressure retaining effect difficult to be achieved as expected. Therefore, the prior art still needs to be improved.

BRIEF SUMMARY

In view of the above deficiencies in the prior art, the object of the present disclosure is to provide a magnetic pressure retaining control device, which is used to solve the problem that the pressure retaining effect of the existing pressure retaining control device is poor during oblique coring.

The present disclosure provides a magnetic pressure retaining control device, which includes: a valve seat, a magnetic valve cover, and a trigger magnetic member for repelling the magnetic valve cover; the magnetic valve cover and an open end of the valve seat are movably connected; when the magnetic valve cover is in an open state, the trigger magnetic member is opposite to the magnetic valve cover.

Optionally, in the magnetic pressure retaining control device, the valve seat includes: a barrel body and a magnet fixed inside the barrel body.

Optionally, in the magnetic pressure retaining control device, the magnet is a cylindrical magnet.

Optionally, in the magnetic pressure retaining control device, a first step portion is provided on an inner wall of the barrel body, the barrel body is sleeved on an outer surface of the cylindrical magnet, and one end of the cylindrical magnet abuts against the first step portion.

Optionally, in the magnetic pressure retaining control device, the cylindrical magnet is formed by splicing four tile-shaped magnets along a circumferential direction, and the tile-shaped magnets have same magnetization direction.

Optionally, in the magnetic pressure retaining control device, the magnetization direction of the tile-shaped magnet is an axial direction.

Optionally, in the magnetic pressure retaining control device, the valve seat further includes: a bottom cover which is detachably connected to the barrel body, and a hole for pressure testing is provided on the bottom cover.

Optionally, in the magnetic pressure retaining control device, the magnetic valve cover includes: a valve cover body, a connecting arm fixed on the valve cover body for movably connecting to the open end of the valve seat, and a valve cover permanent magnet fixed on the valve cover body.

Optionally, in the magnetic pressure retaining control device, the bottom cover includes a bottom cover body, a second step portion configured to connect the barrel body, and a third step portion distributed stepwise with the second step portion. The third step portion is located at an end of the second step portion away from the barrel body.

Optionally, the magnetic pressure retaining control device further includes: a magnetic control mechanism, the magnetic control mechanism includes a pressure sensor for detecting a magnetic value between the trigger magnetic member and the magnetic valve cover, the pressure sensor is fixedly connected to the trigger magnetic member.

Beneficial effects: the embodiments of the present disclosure provide a magnetic pressure retaining control device, which includes a valve seat, a magnetic valve cover movably connected to one end of the valve seat, and a trigger magnetic member for repelling the magnetic valve cover. The magnetic valve cover is directly opposite to the trigger magnetic member when in an open state. A closing force is given to the magnetic valve cover by triggering the magnetic between the magnetic member and the magnetic valve cover, and the force can overcome the gravity and friction of the magnetic valve cover. Therefore, the valve seat and the valve cover can be well closed during horizontal or inclined coring, and the pressure retaining effect can be achieved as expected.

DETAILED DESCRIPTION OF EMBODIMENTS

The present disclosure provides a magnetic pressure retaining control device. In order to make the purpose, the technical solution and the effect of the present disclosure clearer, the present disclosure is further described in detail below. It should be understood that the embodiments described herein are only used to explain the present disclosure, not to limit the present disclosure. Those skilled in the art understand that unless otherwise stated, the forms "a", "an", "said" and "the" used herein may also include plural forms. It should be further understood that the word "comprise" used in the description of the present disclosure refers to the presence of said features, integers, steps, operations, elements, and/or components, but does not exclude the presence or addition of one or more other features, integers, steps, operations, elements, components, and/or groups thereof. It should be understood that when an element is referred to as being "connected" or "coupled" to another element, it can be directly connected or coupled to another element, or an intervening element may also be present. Additionally, "connected" or "coupled" as used herein may include wireless connection or wireless coupling. The expression "and/or" used herein includes all or any one of elements and all combinations of one or more associated listed items.

Unless otherwise defined, all technical and scientific terms used herein have the same meaning as commonly understood by those skilled in the art of the present disclosure. The terminology used herein in the description of the present disclosure is only for the purpose of describing embodiments, and is not intended to limit the present disclosure.

Figure 1:
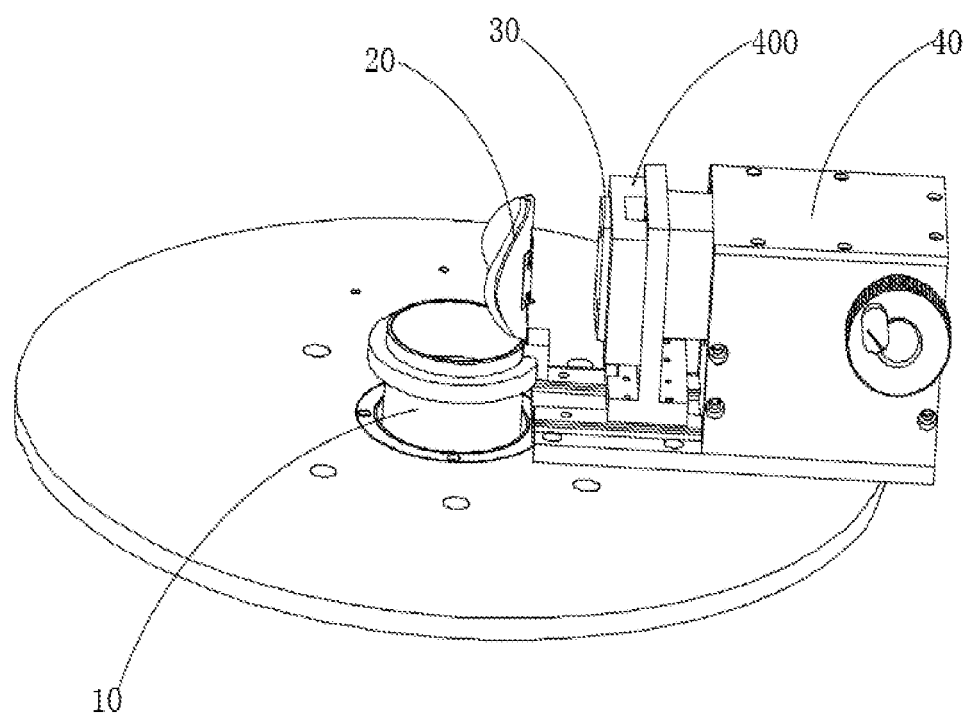
FIG. 1 is a reference diagram of a use state of a magnetic pressure retaining control device provided by an embodiment of the present disclosure.
Figure 2:
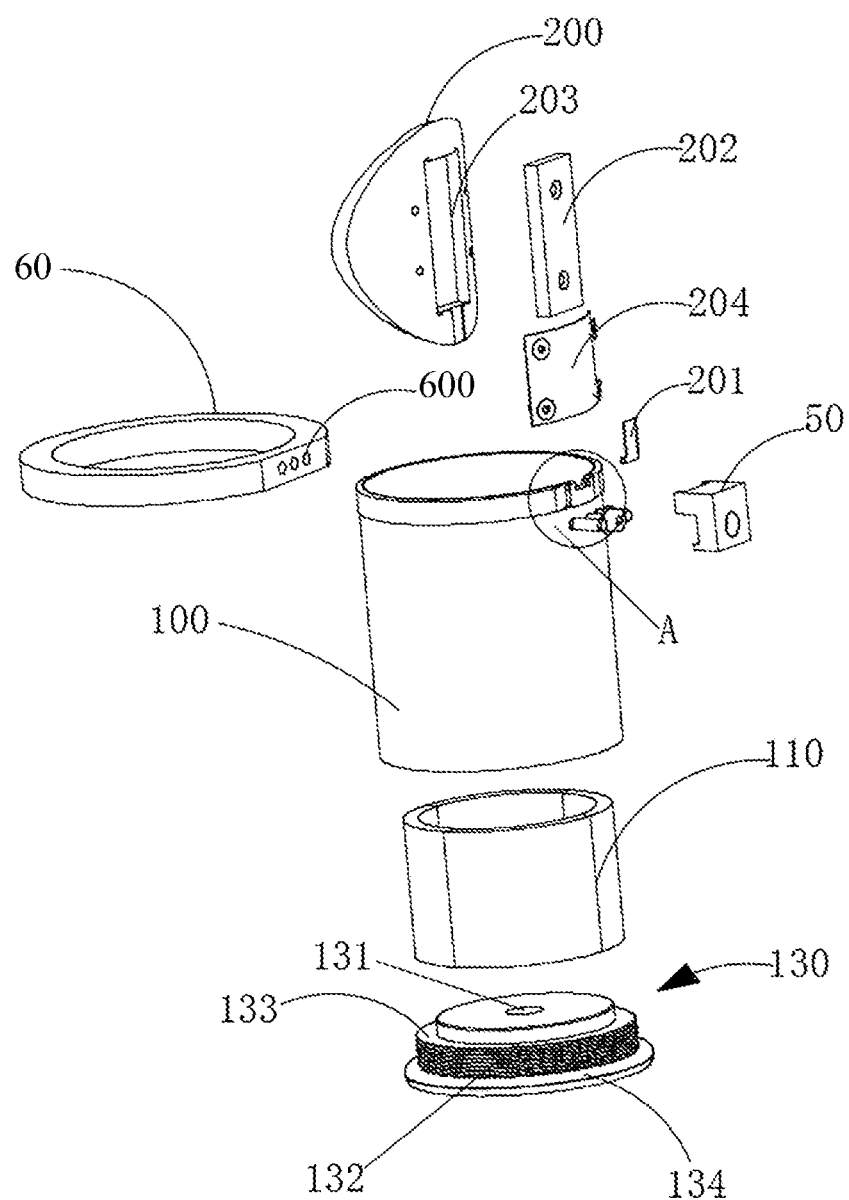
FIG. 2 is an exploded view of a magnetic pressure retaining control device provided by an embodiment of the present disclosure.
Figure 3:
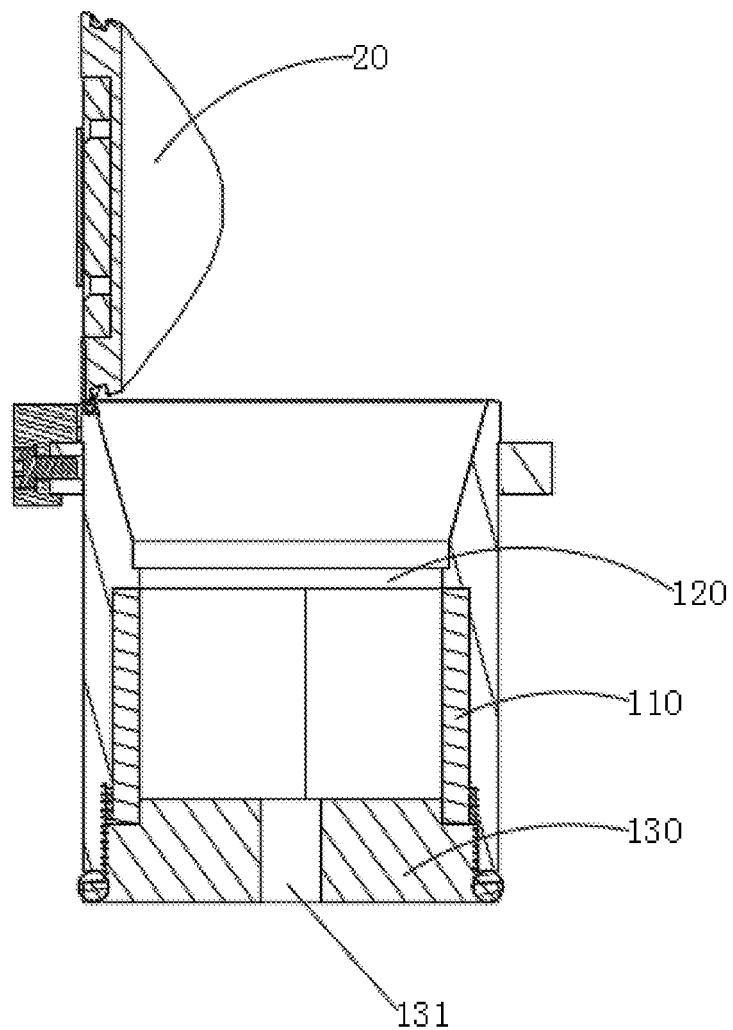
FIG. 3 is a partial cross-sectional view of a magnetic pressure retaining control device provided by an embodiment of the present disclosure.

As shown in FIGS. 1 to 3, an embodiment of the present disclosure provides a magnetic pressure retaining control device, which can be used for deep-ground pressure retaining coring and deep-sea combustible ice pressure retaining coring. The magnetic pressure retaining control device comprises: a valve seat 10, a magnetic valve cover (flap valve cover) 20 movably connected to the valve seat and a trigger magnetic member 30 opposite to the magnetic valve cover when the magnetic valve cover is in an open state. There is a repulsive force between the trigger magnetic member 30 and the magnetic valve cover 20. The trigger magnetic member 30 may be a sheet-shaped or block-shaped magnet, a permanent magnet, or an electromagnet.

In the present embodiment, the trigger magnetic member 30 provides repelling force for the magnetic valve cover 20 to overcome the gravity and friction of the magnetic valve cover, so that the magnetic valve cover and the valve seat could cooperate well even the valve seat is in different states (such as horizontal or inclined at different angles). That is to say, the cooperation between the magnetic valve cover and the valve seat is no longer limited by the state (position) of the valve seat.

In an implementation of the present embodiment, the magnetic valve cover comprises a valve cover body 200, a connecting arm 201 fixed on the valve cover body 200 for movably connecting to an open end of the valve seat 10, and a valve cover permanent magnet 202 fixed on the valve cover body.

The valve cover body 200 is petal-shaped, so it is also called a valve petal. A material of the valve cover body 200 can be the same as a material of the valve seat, or different materials may be adopted. A groove 203 configured to fix the valve cover permanent magnet 202 is arranged in the middle of the valve cover body. It is easy to understand that the size of the groove 203 can be set according to actual needs. For example, a shape of the groove 203 is rectangle. Screw holes are set at a bottom of the rectangular groove, and screw holes matching the screw holes on the bottom of the groove are arranged on the valve cover permanent magnet 202, and the valve cover permanent magnet 202 is fixed inside the rectangular groove by screws. It should be noted that the magnetic valve cover here means that the valve cover is made magnetic by arranging the valve cover permanent magnet 202 on the valve cover. Of course, if necessary, the valve cover can also be produced of magnetic materials. The valve cover permanent magnet 202 can be prepared by different permanent magnetic materials according to requirements, for example, it can be prepared by rare earth permanent magnetic materials.

Further, a protective sheet 204 is also provided on the magnetic valve cover. The protective sheet 204 is placed on a surface of the groove 203 and fixed by four screws, to protect the valve cover permanent magnet 202 inside the groove 203 and prevent external dust or foreign matters from affecting the magnetism of the valve cover permanent magnet 202.

In the present embodiment, the connecting arm 201 may be an elastic piece, one end of the elastic piece is fixed on the valve cover body, and another end comprises an O-shaped connecting part, the connecting arm is movably connected to the valve seat through the O-shaped connecting part. It is easy to understand that the connection between the elastic piece and the valve cover body is located on the same straight line as the groove 203. That is to say, the groove 203 and the connection between the elastic sheet and the valve cover body are both located on a central axis of the valve cover body. By placing the groove 203 and the connection between the elastic sheet and the valve cover body on the central axis of the valve cover body, it is possible to prevent the magnetic valve cover from tilting and deflecting when the magnetic valve cover is repelled by the trigger magnetic member.

In an implementation of the present embodiment, the valve seat 10 comprises a barrel body 100 and a magnet 110 fixed inside the barrel body 100.

Figure 4:
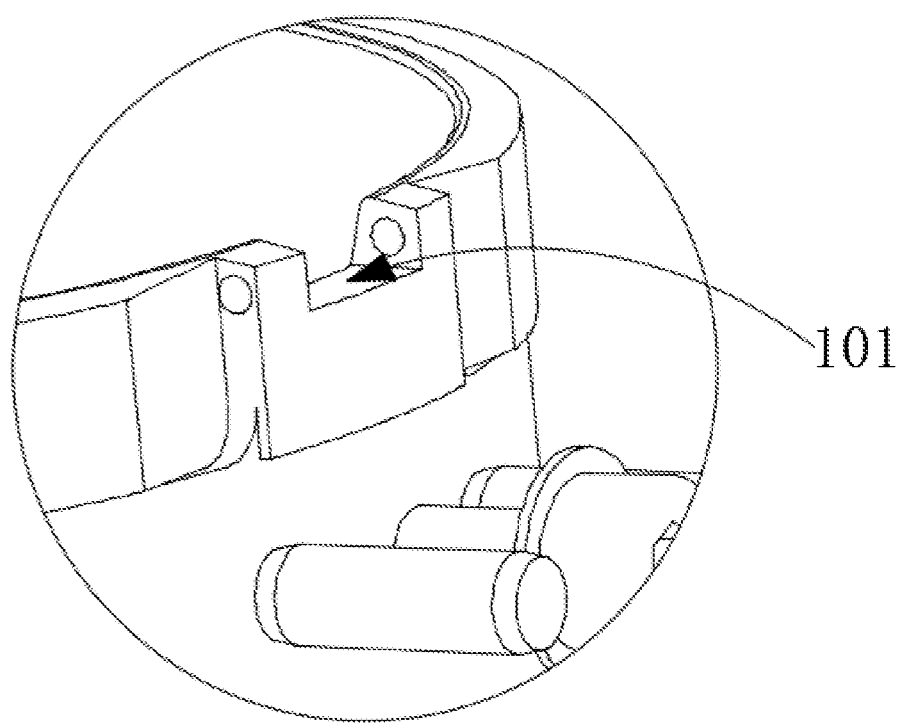
FIG. 4 is an enlarged view of part A in FIG. 2.

In some embodiments, the barrel body 100 is a cylindrical barrel with openings at both ends, and a material of the barrel body 100 can be metal, such as cast iron, steel, and the like. As shown in FIG. 4, one end of the barrel body 100 is provided with a concave connecting portion 101, and the concave connecting portion 101 comprises two hanging lugs, and screw holes are set on the hanging lugs. While the O-shaped connecting part of the connecting arm is arranged in the concave connecting portion 101, passing a bolt through the screw hole on the hanging lug and a through hole on the connecting arm to movably connect the connecting arm with the barrel body 100.

In the present embodiment, the magnet 110 is a cylindrical magnet, and the cylindrical magnet may be formed by splicing at least two tile-shaped magnets along a circumferential direction, for example, four tile-shaped magnets along the circumference direction are spliced to form the magnet. Magnetization directions of the tile-shaped magnets can be the same or different, and the magnetization directions comprise an axial magnetization direction and a radial magnetization direction.

In the present embodiment, a material of the cylindrical magnet may be a rare earth permanent magnetic material, for example, the rare earth permanent magnetic material with the grade of N52. By arranging magnets in the valve seat, the magnetic valve cover and the valve seat are tightly attached and closed.

In an implementation of the present embodiment, the magnetic pressure retaining control device further comprises a clip 60 arranged on an outer surface of the valve seat. By arranging the clip 60 on the outer surface of the valve seat, the valve seat is fixed.

In the present embodiment, a whole body of the clip 60 is circular, a connecting and fixing member 600 for fixing is also provided on the clip 60, and a screw hole is provided on the connecting and fixing member 600. Three screw holes are arranged side by side, and the clip 60 is fixed to the valve seat through a fixing member 50. The clip 60 is fixed on an end of the valve seat connected to the magnetic valve cover.

Figure 5:
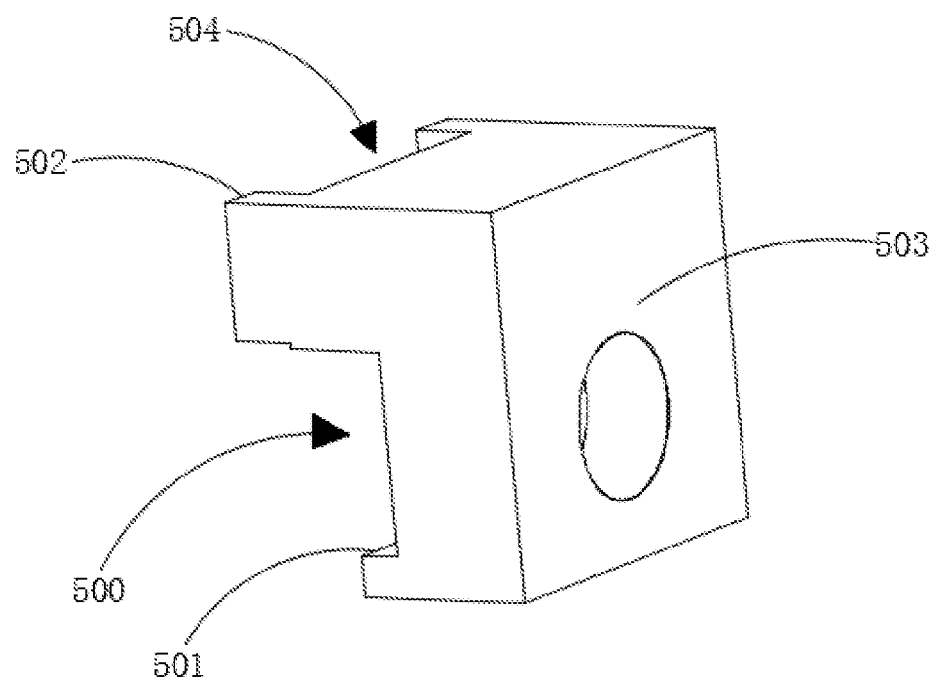
FIG. 5 is a perspective view of a fixing member.

In the present embodiment, as shown in FIG. 5, the fixing member 50 comprises a groove 500 adapted to the connecting and fixing member 600. The groove 500 comprises a first groove wall 501, a second groove wall 502, and a groove bottom 503. A through hole is arranged on the groove bottom 503, the clip is fixed on the valve seat by passing a screw through the through hole and the screw hole on the connecting and fixing member. A height of the first groove wall 501 is smaller than a height of the second groove wall 502, and a recess 504 is provided on the second groove wall 502, and the recess 504 is configured to accommodate the connecting arm 201, ends on both sides of the recess are against the valve seat. When the connecting and fixing member 600 is fixed on the valve seat, the first groove wall 501 is pressed against the outer surface of the valve seat, by pressing the first groove wall 501 and the second groove wall 502 are against the outer surface of the valve seat, the clip 60 can be firmly fixed on the valve seat. By cooperating the clip with other fixing members, the valve seat can be firmly fixed.

In an implementation of the present embodiment, a first step portion 120 is arranged on an inner wall of the barrel body 100, and the first step portion 120 divides an inner space of the barrel body 100 into two parts (for example, the first part and the second part, the first part is a part closer to the magnetic valve cover, the second part is a part away from the magnetic valve cover), the first step portion 120 is located in an upper middle part of the barrel body 100 (It can be understood that the lengths of the two parts of the inner space of the barrel body divided by the first step portion 120 are different). During assembly, the barrel body 100 can be sleeved on an outer surface of the cylindrical magnet 110, one end of the cylindrical magnet abuts against the first step portion 120, that is, the cylindrical magnet 110 is disposed along the first step portion.

In the present embodiment, the cylindrical magnet 110 is located in the second part. Arranging the cylindrical magnet at the second part (away from the magnetic valve cover) can avoid interference with the opening of the magnetic valve cover during the sampling process.

In an implementation of the present embodiment, the valve seat 10 further comprises: a bottom cover 130, the bottom cover 130 is detachably connected to the barrel body 100, and the bottom cover 130 is provided with a hole 131 for pressure test.

In the present embodiment, the bottom cover 130 is used to block the other end of the barrel body 100 (the end not connected to the magnetic valve cover). By setting the bottom cover 130 and the magnetic valve cover 20, the sealing of the valve seat is realized, that is, a sealing space is formed inside the valve seat.

In the present embodiment, the bottom cover 130 comprises a bottom cover body 132, a second step portion 133 for connecting the barrel body, and a third step portion 134 distributed stepwise with the second step portion 133, the third step portion 134 is located at an end of the second step portion 133 away from the barrel body 100. An outer surface of the second step portion 133 is provided with external threads, through which the connection with the barrel body can be realized. It is easy to understand that an inner surface of the barrel body is provided with internal treads matching the external threads on the outer surface of the second step. After the second step portion 133 is screwed on the barrel body, an end of the cylindrical magnet 110 away from the magnetic valve cover is pressed against the second step portion, and the cylindrical magnet 110 is sandwiched between the first step portion and the second step portion, the third step portion is in close contact with the end of the barrel body, that is to say, a diameter of the third step portion 134 is larger than a diameter of the second step portion 133.

In the present embodiment, the hole 131 provided on the bottom cover 130 for testing the sealing pressure is located at a center of the bottom cover 130. The hole 131 can be connected to an air pump or a water pump, and air or liquid can be transmitted into the valve seat to test the tightness of the valve. It is easy to understand that after the test is completed, the hole can be blocked by a cock.

In an implementation of the present embodiment, the magnetic pressure retaining control device further comprises a magnetic control mechanism 40, and the magnetic control mechanism 40 comprises a pressure sensor 400 for detecting a magnetic value between the trigger magnetic member 30 and the magnetic valve cover 20. The pressure sensor 400 is fixedly connected to the trigger magnetic member 30.

In the present embodiment, a magnetic value between the trigger magnetic member and the magnetic valve cover can be controlled by adjusting a distance between the trigger magnetic member and the magnetic valve cover, so as to adapt to a closing force between the magnetic valve cover and the valve seat in different states. The magnetic value between the magnetic valve cover and the trigger magnetic member is detected by the pressure sensor 400, therefore the magnetic values between the magnetic valve cover and the trigger magnetic member under different distance conditions are obtained, so that an optimal distance between the magnetic valve cover and the trigger magnetic member is formulated.

In summary, the embodiment of the present disclosure provides a magnetic pressure retaining control device, which comprises: a valve seat, a magnetic valve cover, and a trigger magnetic member for repelling the magnetic valve cover; the magnetic valve cover is movably connected to an open end of the valve seat; when the magnetic valve cover is in an open state, the trigger magnetic member is opposite to the magnetic valve cover. A cylindrical magnet is also arranged in the valve seat. The magnetic between the trigger magnetic member and the magnetic valve cover provides a closing force for the valve cover, and the magnetic between the magnetic valve cover and the cylindrical magnet on the valve seat makes the magnetic valve cover and the valve seat be tightly closed, by the magnetic between the trigger magnetic member and the magnetic valve cover and the magnetic between the magnetic valve cover and the valve seat, a reliable guarantee for the closure between the magnetic valve cover and the valve seat is provided. At the same time, a repulsive force between the trigger magnetic member and the magnetic valve cover can well overcome the gravity of the valve cover itself and the friction between the valve cover and the connecting arm (elastic piece). In this way, the valve seat and the valve cover can be tightly closed under different conditions.

It should be understood that the application of the present disclosure is not limited to the above embodiments, and those skilled in the art can make improvements or transformations according to the above descriptions, and all these improvements and transformations should belong to the protection scope of the appended claims of the present disclosure.

What is claimed is:

1. A magnetic pressure retaining control device, comprising:
   a valve seat;
   a magnetic valve cover; and
   a trigger magnetic member for repelling the magnetic valve cover,
   wherein the magnetic valve cover and an open end of the valve seat are movably connected; when the magnetic valve cover is in an open state, the trigger magnetic member is opposite to an end surface of the magnetic valve cover away from an inside of the valve seat, and
   wherein the valve seat comprises a barrel body and a magnet fixed inside the barrel body.

2. The magnetic pressure retaining control device according to claim 1, wherein the magnetic valve cover comprises: a valve cover body, a connecting arm fixed on the valve cover body for movably connecting to the open end of the valve seat, and a valve cover permanent magnet fixed on the valve cover body.

3. The magnetic pressure retaining control device according to claim 1, wherein the valve seat comprises: a bottom cover, the bottom cover is detachably connected to the barrel body, and a hole for pressure testing is provided on the bottom cover.

4. The magnetic pressure retaining control device according to claim 3, wherein the bottom cover comprises a bottom cover body, a second step portion configured to connect the barrel body, and a third step portion distributed stepwise with the second step portion, the third step portion is located at an end of the second step portion away from the barrel body.

5. The magnetic pressure retaining control device according to claim 1, wherein the magnet is a cylindrical magnet.

6. The magnetic pressure retaining control device according to claim 5, wherein a first step portion is provided on an inner wall of the barrel body, the barrel body is sleeved on an outer surface of the cylindrical magnet, and one end of the cylindrical magnet abuts against the first step portion.

7. The magnetic pressure retaining control device according to claim 6, wherein the cylindrical magnet is formed by splicing four tile-shaped magnets along a circumferential direction, and the four tile-shaped magnets have a same magnetization direction.

8. The magnetic pressure retaining control device according to claim 7, wherein the magnetization direction of the four tile-shaped magnet is an axial direction.

9. A magnetic pressure retaining control device, comprising:
   a valve seat;
   a magnetic valve cover;
   a trigger magnetic member for repelling the magnetic valve cover; and
   a magnetic control mechanism comprising a pressure sensor for detecting a magnetic value between the trigger magnetic member and the magnetic valve cover, wherein the pressure sensor is fixedly connected to the trigger magnetic member,
   wherein the magnetic valve cover and an open end of the valve seat are movably connected; when the magnetic valve cover is in an open state, the trigger magnetic member is opposite to an end surface of the magnetic valve cover away from an inside of the valve seat.

* * * * *